United States Patent
Agarwal et al.

(10) Patent No.: US 11,809,220 B1
(45) Date of Patent: Nov. 7, 2023

(54) ADAPTIVE MEMORY ERROR DETECTION AND CORRECTION

(71) Applicant: QUALCOMM INCORPORATED, San Diego, CA (US)

(72) Inventors: Deepak Kumar Agarwal, Bangalore (IN); Kunal Desai, Bangalore (IN); Jimit Shah, Bangalore (IN); Rakesh Gehalot, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/725,170

(22) Filed: Apr. 20, 2022

(51) Int. Cl.
*G06F 11/10* (2006.01)

(52) U.S. Cl.
CPC ................ *G06F 11/1044* (2013.01)

(58) Field of Classification Search
None
See application file for complete search history.

(56) References Cited

U.S. PATENT DOCUMENTS

| | | |
|---|---|---|
| 9,419,655 B2 | 8/2016 | Cai et al. |
| 2008/0282106 A1 | 11/2008 | Shalvi et al. |
| 2016/0162352 A1* | 6/2016 | Singhai ............... G06F 11/1048 714/773 |
| 2016/0301427 A1 | 10/2016 | Sprouse et al. |

OTHER PUBLICATIONS

Related PCT Patent App. Ser. No. PCT/US2023/064807, filed on Mar. 22, 2023, Application Title: Adaptive Memory Error Detection and Correction, International Search Report & the Written Opinion of ISA (EPO), transmitted dated Jun. 16, 2023, eight pages.

\* cited by examiner

*Primary Examiner* — Cynthia Britt
*Assistant Examiner* — Matthew W Wahlin
(74) *Attorney, Agent, or Firm* — Smith Tempel Blaha LLC/Qualcomm (57) ABSTRACT

Error detection and correction (EDAC) logic of a memory subsystem may be monitored for error corrections, with the EDAC logic configured to use a first EDAC level. The number of error corrections made by the EDAC logic while using the first EDAC level during a time interval may be determined. The EDAC logic may be switched from using the first EDAC level to using a second EDAC level when the number of error corrections using the first EDAC level during the time interval exceeds a threshold.

34 Claims, 8 Drawing Sheets

ADAPTIVE MEMORY ERROR DETECTION AND CORRECTION

DESCRIPTION OF THE RELATED ART

A computing device may include multiple subsystems, cores, or other components. Such a computing device may be, for example, a portable computing device ("PCD"), such as a laptop or palmtop computer, a cellular telephone or smartphone, portable digital assistant, portable game console, etc. The multiple subsystems, cores or other components of a computing device may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other processing subsystems, such as a transceiver or "modem" subsystem that provides wireless connectivity, a memory subsystem, etc.

The reliability of data communication and storage may be adversely impacted by environmental effects. Data stored in a memory may be corrupted by environmental conditions such as radiation, cosmic rays, high temperatures, etc. Development of high reliability, safety-critical computing systems, such as automotive control systems, may demand higher reliability data storage.

Error detection and correction ("EDAC") techniques have been used in memory systems to improve reliability. Error detection relates to detecting errors and providing a notification that the error occurred, while error correction relates to transforming erroneous data into corrected data. It would be desirable to provide more robust yet efficient use of EDAC in safety-critical and other computing systems.

SUMMARY OF THE DISCLOSURE

Systems, methods, computer-readable media, and other examples are disclosed for adaptive memory error detection and correction (EDAC) in a computing device.

An exemplary method for adaptive memory EDAC may include monitoring EDAC logic of a memory subsystem for error corrections with the EDAC logic configured to use a first EDAC level. The method may further include determining a number of error corrections using the first EDAC level during a time interval. The method may also include determining whether the number of error corrections using the first EDAC level during the time interval exceeds a first threshold. The method may yet further include switching the EDAC logic from using the first EDAC level to using a second EDAC level when the number of error corrections using the first EDAC level during the time interval exceeds the first threshold.

An exemplary system for adaptive memory EDAC may include EDAC logic and EDAC level control logic in a memory subsystem. The EDAC level control logic may be configured to monitor the EDAC logic for error corrections with the EDAC logic configured to use a first EDAC level. The EDAC level control logic may be further configured to determine a number of error corrections using the first EDAC level during a time interval. The EDAC level control logic may also be configured to determine whether the number of error corrections using the first EDAC level during the time interval exceeds a first threshold. The EDAC level control logic may yet further be configured to switch the EDAC logic from using the first EDAC level to using a second EDAC level when the number of error corrections using the first EDAC level during the time interval exceeds the first threshold.

An exemplary system for adaptive memory EDAC may include means for monitoring EDAC logic of a memory subsystem for error corrections with the EDAC logic configured to use a first EDAC level. The system may further include means for determining a number of error corrections using the first EDAC level during a time interval. The system may also include means for determining whether the number of error corrections using the first EDAC level during the time interval exceeds a first threshold. The system may yet further include means for switching the EDAC logic from using the first EDAC level to using a second EDAC level when the number of error corrections using the first EDAC level during the time interval exceeds the first threshold.

An exemplary computer-readable medium for adaptive memory EDAC may include a non-transitory computer-readable medium having instructions stored thereon in computer-executable form. The instructions when executed by a processing system of a computing device, may configure the processing system to control monitoring EDAC logic of a memory subsystem for error corrections with the EDAC logic configured to use a first EDAC level. The instructions may further configure the processing system to control determining a number of error corrections using the first EDAC level during a time interval. The instructions may also configure the processing system to control determining whether the number of error corrections using the first EDAC level during the time interval exceeds a first threshold. The instructions may yet further configure the processing system to control switching the EDAC logic from using the first EDAC level to using a second EDAC level when the number of error corrections using the first EDAC level during the time interval exceeds the first threshold.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Generally, error detection and correction ("EDAC") techniques apply hash functions or algorithms on original (i.e., correct) data to produce a result comprising some number of bits. Various types of EDAC algorithms are known. The resulting bits may be referred to as parity bits, checksum bits, cyclic redundancy check ("CRC") bits, an error-correcting code ("ECC"), syndrome bits, or another term, depending upon the type of algorithm, but may be referred to in the present disclosure for generality as a tag. When the data word is stored in the memory, the computed tag corresponding to the data word is stored in the memory in association with the data word. When the data word and the associated tag are later read from the memory, another algorithm may then use the tag as an additional input to detect, correct, or both detect and correct errors in the data word. The number of bits that can be detected or corrected depends upon the algorithm. An EDAC algorithm that detects up to two erroneous bits and corrects up to one erroneous bit may be referred to as Single Error Correction/Double Error Detection ("SECDED"). An EDAC algorithm that detects up to three erroneous bits and corrects up to two erroneous bits may be referred to as Double Error Correction/Triple Error Detection ("DECTED"). An EDAC algorithm that detects up to four erroneous bits and corrects up to three erroneous bit may be referred to as Triple Error Correction/Quad Error Detection ("TECQED").

The length of the tag and complexity of the EDAC algorithm may be directly related to the number of erroneous bits that can be detected and corrected. For example, it may be necessary to use a 10-bit tag to perform SECDED and a 28-bit tag to perform TECQED for a 256 bit data word. A 10-bit tag may require two bytes of storage space (with the remaining six bits zero-padded), while a 28-bit tag may require four bytes of storage space (with the remaining four bits zero-padded). To economize on storage space, maintain high memory system performance, or provide other performance advantages it may be undesirable to use a more robust EDAC algorithm or longer tag than necessary to detect and correct the errors that are likely to occur. The solutions described below relate to switching from less robust or lower-level EDAC, such as, for example, SECDED, to more robust or higher-level EDAC, such as, for example, DECTED or TECQED, when the number of errors exceeds a threshold. The solutions described herein may be provided in a safety-critical computing system or any other computing system.

Figure 1:
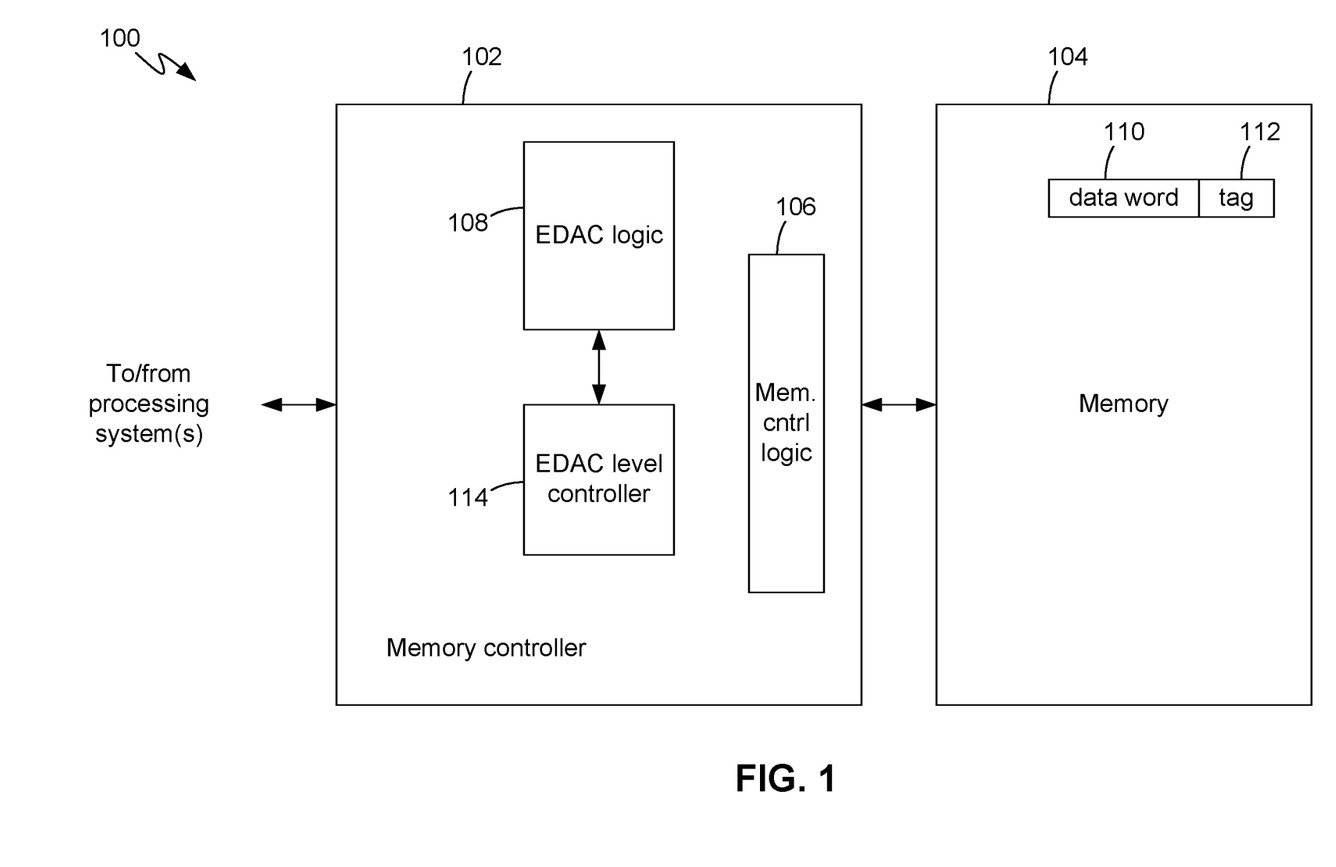
FIG. 1 is a block diagram of a system for adaptive memory error detection and correction (EDAC), in accordance with exemplary embodiments.

As shown FIG. 1, in an illustrative or exemplary embodiment a memory system 100 may include a memory controller 102 and memory 104. The memory system 100 may be included in a computing device or system (not shown in FIG. 1) of any type. The memory 104 may be of any type, such as, for example, dynamic random access memory ("DRAM") or static RAM ("SRAM"). The memory 104 is depicted as a unitary element in FIG. 1 for purposes of clarity but may comprise any number of sub-units, modules, chips, arrays, etc. In an example, the memory 104 may comprise double data-rate synchronous DRAM or "DDR-SDRAM," sometimes referred to for brevity as "DDR." Although not shown in FIG. 1 for purposes of clarity, the memory system 100 may be coupled (e.g., via one or more buses or other data interconnects) to one or more processing systems of the computing device (not shown in FIG. 1).

The memory controller 102 may include logic that configures the memory controller 102 to perform various functions relating to storage of data in (also referred to as writing data to) and retrieval of data from (also referred to as reading data from) the memory 104. The memory controller 102 may perform such writing and reading of data in response to write and read requests received from a processing system. As the manner in which the memory controller 102 controls the writing and reading of data is well understood by one of ordinary skill in the art, such aspects are not described herein. Nevertheless, it may be appreciated that the memory controller 102 may include memory control logic 106 that configures the memory controller 102 to perform such conventional write, read and other functions. The memory controller 102 may also include EDAC logic 108 that configures the memory controller 102 to detect and correct errors in data read from the memory 104 and to otherwise operate in the manner described below.

The memory controller 102 may receive a data word 110 from a processing system or other source in association with a write request. In response to the write request, the EDAC logic 108 may apply an EDAC algorithm to the data word 110 to be written to the memory 104. The tag 112 is the result of the EDAC algorithm (computation). The memory controller 102 may then cause the data word 110 to be stored in the memory 104 and also cause the computed tag 112 to be stored in the memory 104 in association with that data word 110, as shown in FIG. 1. Although for purposes of clarity only one exemplary data word 110 and associated tag 112 are shown in FIG. 1, the memory 104 may be sized and otherwise configured to store any number of data words 110 and associated tags 112, as understood by one of ordinary skill in the art.

When the memory controller 102 later reads the data word 110 and the associated tag 112 from the memory 104 in response to a read request, the EDAC logic 108 may apply the EDAC algorithm to the data word 110 and the tag 112 to produce a result. The result may be either that no error was detected or that an error was detected. No error means that all bits of the data word 110 read from the memory 104 matched the corresponding bits of the original data word 110 that was written to the memory 104. In contrast, an error result means that one or more bits of the data word 110 read from the memory 104 did not match the corresponding bits of the original data word 110 that was written to the memory 104. The EDAC logic 108 may be configurable to operate in accordance with multiple, selectable EDAC levels. Depending upon which of the EDAC levels is selected and upon the severity of the error (i.e., the number of erroneous bits in the data word 110), the EDAC logic 108 may detect the error or correct the error.

For example, a first EDAC level may be SECDED, which can detect up to two erroneous bits and correct up to one erroneous bit. A second EDAC level may be TECQED, which can detect up to four erroneous bits and correct up to three erroneous bits. Although in the examples of operation described below, the EDAC logic 108 is configured to operate in a selected one of two EDAC levels, in other examples such EDAC logic may be configured to operate in a selected one of more than two EDAC levels. In such other examples, another selectable mode or EDAC level could be DECTED, which can detect up to three erroneous bits and corrects up to two erroneous bits. As SECDED, DECTED, TECQED, and other EDAC algorithms are well understood by one of ordinary skill in the art, they are not described herein.

An EDAC level controller 114 may select the EDAC level. The EDAC logic 108 may be configured to receive a selection indication from the EDAC level controller 114 that indicates which of the two or more EDAC levels is selected and therefore which of the two or more corresponding EDAC algorithms the EDAC logic 108 is to apply as data is written to or read from the memory 104. Although not shown for purposes of clarity, the memory controller 102 may similarly be configured with other logic (not shown) to perform various conventional memory controller functions in addition to the functions specifically described herein. The memory control logic 106, EDAC logic 108, EDAC level controller 114, and any other logic with which the memory controller 102 may be configured may comprise hardware (e.g., finite state machines), software (including firmware), or any combination of hardware and software.

Figure 2:
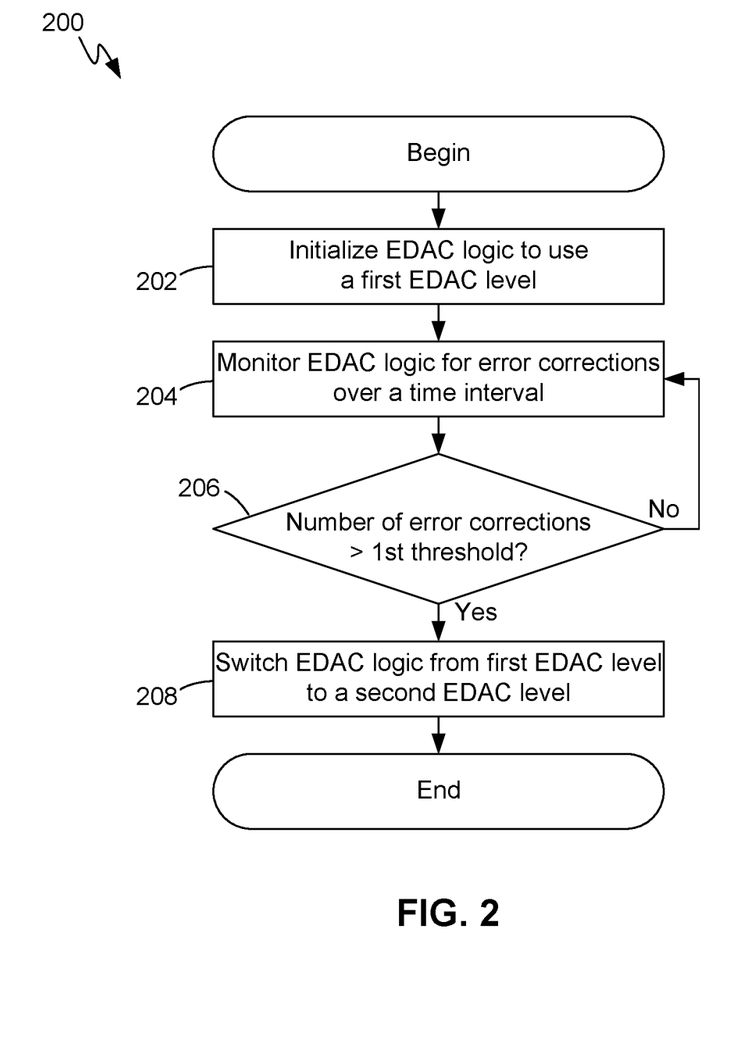
FIG. 2 is a flow diagram illustrating a method for adaptive memory EDAC, in accordance with exemplary embodiments.

As shown in FIG. 2, a method 200 for adaptive memory error detection and correction may include the following. As indicated by block 202, the method 200 may include initializing the EDAC logic of a memory system or subsystem to use a first EDAC level, such as, for example, SECDED. As indicated by block 204, the method 200 may further include monitoring the EDAC logic for error corrections, with the EDAC logic configured to use the first EDAC level. For example, the number of error corrections made by the EDAC logic during a periodic time interval may be counted. The time interval may be, for example, a number of milliseconds. As indicated by block 206, the method 200 may also include determining whether the number of error corrections made by the EDAC logic during the time interval is greater than a first threshold. If it is determined that the number of error corrections made by the EDAC logic during the time interval is not greater than the first threshold, then the method 200 may continue as described above with regard to block 204, where the EDAC logic continues to be monitored (i.e., over the next time interval). As indicated by block 208, if it is determined that the number of error corrections made by the EDAC logic during the time interval is greater than the first threshold, then the EDAC logic may be switched from using the first EDAC level to using a second EDAC level, such as, for example, TECQED. The steps or actions described above with regard to blocks 202-208 may be performed or controlled by, for example, the above-described EDAC level controller 114 (FIG. 1). Although not shown in FIG. 2 for purposes of clarity, such a method could further include switching the EDAC logic from the second EDAC level back to the first EDAC level based on additional conditions, such as the number of errors falling below a threshold.

Figure 3:
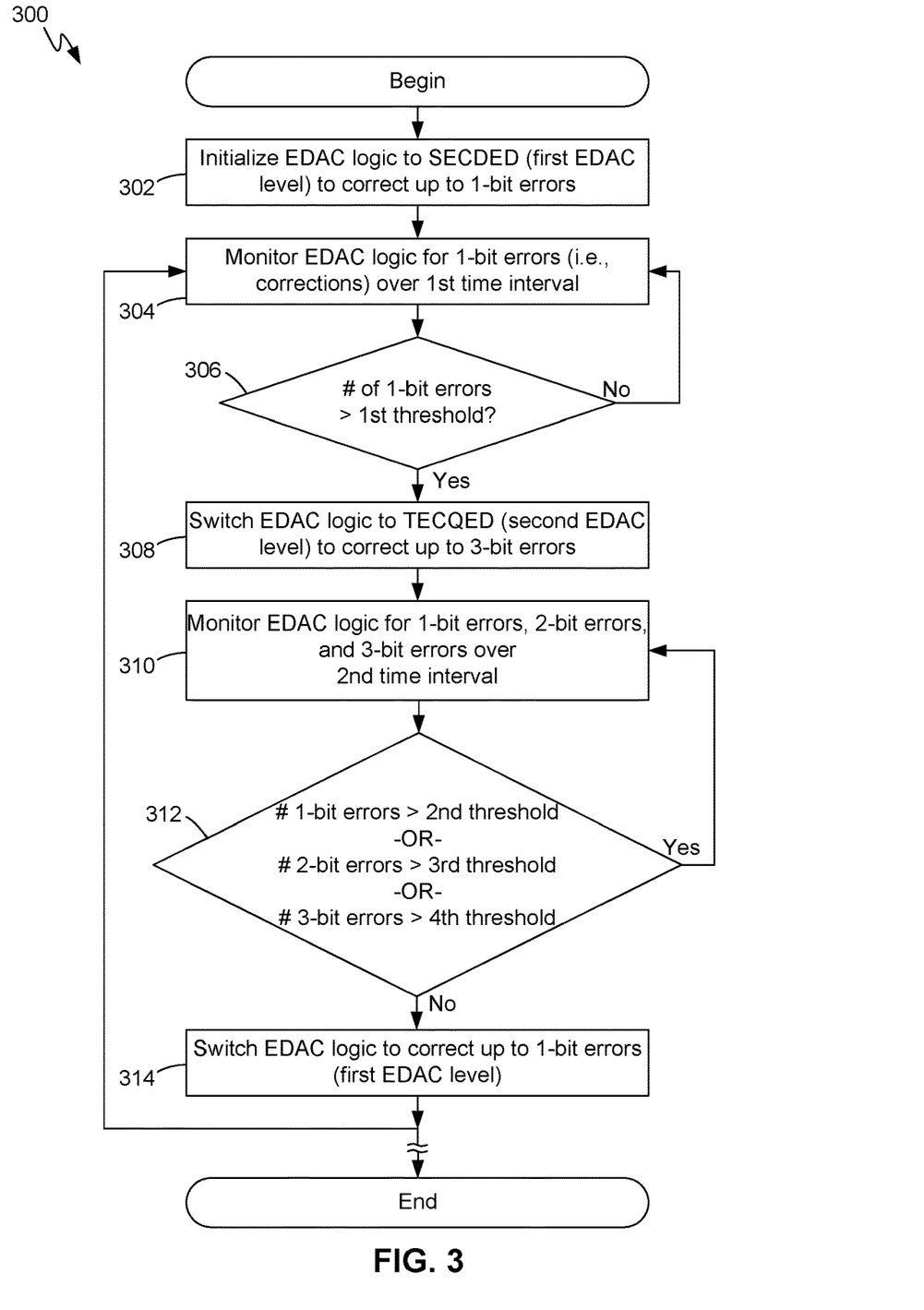
FIG. 3 is a flow diagram illustrating a method for adaptive memory EDAC, in accordance with exemplary embodiments.

As shown in FIG. 3, a method 300 for adaptive memory error detection and correction may include the following. As indicated by block 302, the method 300 may include initializing the EDAC logic of a memory system or subsystem to use SECDED and thus to correct up to 1-bit errors. As indicated by block 304, the method 300 may further include monitoring the EDAC logic for 1-bit error corrections, including determining the number of 1-bit error corrections over a first time interval. As indicated by block 306, the method 300 may also include determining whether the number of 1-bit error corrections made by the EDAC logic during the first time interval is greater than a first threshold. If it is determined that the number of error corrections made by the EDAC logic during the first time interval is not greater than the first threshold, then the method 300 may continue as described above with regard to block 304, where the EDAC logic continues to be monitored for 1-bit error corrections. As indicated by block 308, if it is determined that the number of 1-bit error corrections made by the EDAC logic during the first time interval is greater than the first threshold, then the EDAC logic may be switched from using SECDED to using a TECQED and thus to correct up to 3-bit errors.

As indicated by block 310, the method 300 may then (i.e., following switching from SECDED to TECQED) include monitoring the EDAC logic for detection of 1-bit errors, 2-bit errors and 3-bit errors, including determining the number of 1-bit errors, 2-bit errors and 3-bit errors detected over a second time interval. As indicated by block 312, the method 300 may also include determining whether the number of 1-bit errors detected during the second time interval is greater than a second threshold, or the number of 2-bit errors detected during the second time interval is greater than a third threshold, or the number of 3-bit errors detected during the second time interval is greater than a fourth threshold. If it is determined that the number of 1-bit errors detected during the second time interval is greater than the second threshold, or the number of 2-bit errors detected during the second time interval is greater than the third threshold, or the number of 3-bit errors detected during the second time interval is greater than the fourth threshold, then the method 300 may continue as described above with regard to block 310, where the EDAC logic continues to be monitored for 1-bit error detections, 2-bit error detections and 3-bit error detections. The third threshold may be, for example, zero. That is, if the number of 2-bit errors detected is greater than zero, the method 300 may continue at block 310. The fourth threshold may be, for example, zero. That is, if the number of 3-bit errors detected is greater than zero, the method 300 may continue at block 310. Generally, the third and fourth thresholds each may be lower than the first threshold.

If it is determined (block 312) that the number of 1-bit errors detected during the second time interval is not greater than the second threshold, and the number of 2-bit errors detected during the second time interval is not greater than the third threshold, and the number of 3-bit errors detected during the second time interval is not greater than the fourth threshold, then the EDAC logic may be switched from using TECQED back to using SECDED, as indicated by block 314. To prevent back and forth switching, a form of hysteresis may be provided. The decision (block 312) to switch back from TECQED to SECDED can be taken if the condition indicated in block 312 is satisfied for a longer time interval than the condition indicated in block 306. That is, the second time interval (block 310) may be longer than the first time interval (block 304). Also the threshold for switching from TECQED to SECDED (i.e., the block 312 second threshold) can be made lower than the threshold for switching from SECDED to TECQED (i.e., the block 306 first threshold) or it can even be made zero. The method 300 may then continue as described above with regard to block 304, where the EDAC logic is again monitored for 1-bit error corrections.

Figure 4A:
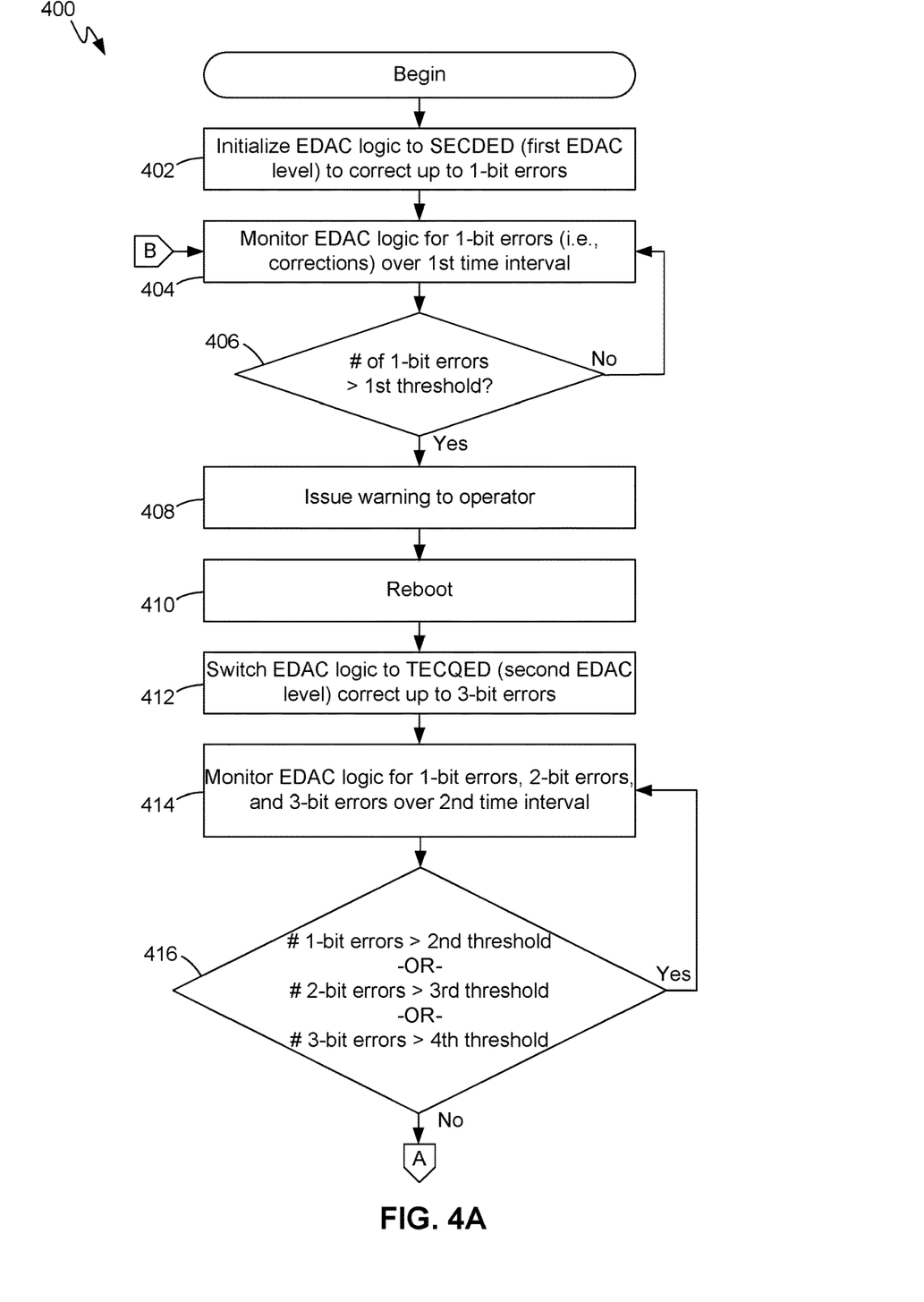
FIG. 4A is a flow diagram illustrating a method for adaptive memory EDAC, in accordance with exemplary embodiments.
Figure 4B:
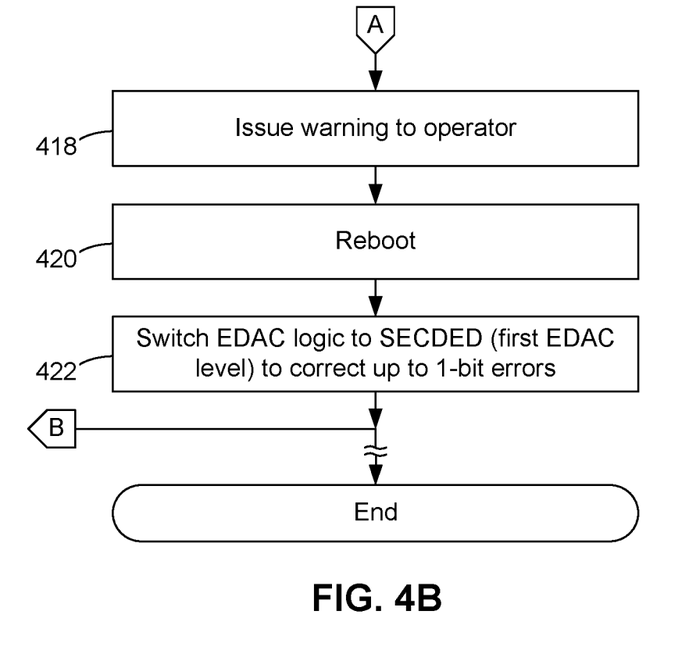
FIG. 4B is a continuation of the flow diagram of FIG. 4A.

As shown in FIGS. 4A-4B, a method 400 for adaptive memory error detection and correction may include the following. As indicated by block 402, the method 400 may include initializing the EDAC logic of a memory system or subsystem to use SECDED and thus to correct up to 1-bit errors. As indicated by block 404, the method 400 may further include monitoring the EDAC logic for 1-bit error corrections, including determining the number of 1-bit error corrections over a first time interval. As indicated by block 406, the method 400 may also include determining whether the number of 1-bit error corrections made by the EDAC logic during the first time interval is greater than a first threshold. If it is determined that the number of error corrections made by the EDAC logic during the first time interval is not greater than the first threshold, then the method 400 may continue as described above with regard to block 404, where the EDAC logic continues to be monitored for 1-bit error corrections.

As indicated by block 408, if it is determined that the number of 1-bit error corrections made by the EDAC logic during the first time interval is greater than the first threshold, then a warning may be issued to an operator or user. For example, the operator of a vehicle in which the computing system controls driving or other safety-critical functions may be warned to slow or stop the vehicle, in an attempt to reduce reliance on the computing system.

As indicated by block 410, a reboot may then be performed. The reboot may include the memory system. In some examples, the reboot may include other systems or subsystems in addition to the memory system, if such a reboot of other such systems or subsystems is necessary to return them to a state in which they can continue to interoperate with the memory system. In some examples, the reboot may include an entire SoC. Following this reboot, the EDAC logic may be switched from using SECDED to using TECQED and thus to correct up to 3-bit errors, as indicated by block 412. Although not shown in the method 400, the computing system and its memory system may return to their normal operational mode (e.g., controlling a vehicle) after the EDAC logic is switched to TECQED. The switch to TECQED may provide extra protection against erroneous data being read from the memory and adversely affecting operation of the computing system. Similarly, although not shown in the method 400, after the switch to TECQED the operator may be advised that it is safe to resume operation of the vehicle.

As indicated by block 414, the method 400 may then (i.e., following switching from SECDED to TECQED) include monitoring the EDAC logic for detection of 1-bit errors, 2-bit errors and 3-bit errors, including determining the number of 1-bit errors, 2-bit errors and 3-bit errors detected over a second time interval. As indicated by block 416, the method 400 may also include determining whether the number of 1-bit errors detected during the second time interval is greater than a second threshold, or the number of 2-bit errors detected during the second time interval is greater than a third threshold, or the number of 3-bit errors detected during the second time interval is greater than a fourth threshold. The first, second, third and fourth thresholds may be as described above with regard to blocks 306 and 312 (FIG. 3). If it is determined (block 414) that the number of 1-bit errors detected during the second time interval is greater than the second threshold, or the number of 2-bit errors detected during the second time interval is greater than the third threshold, or the number of 3-bit errors detected during the second time interval is greater than the fourth threshold, then the method 400 may continue as described above with regard to block 414, where the EDAC logic continues to be monitored for 1-bit error detections, 2-bit error detections and 3-bit error detections.

If it is determined (block 414) that the number of 1-bit errors detected during the second time interval is not greater than the second threshold, and the number of 2-bit errors detected during the second time interval is not greater than the third threshold, and the number of 3-bit errors detected during the second time interval is not greater than the fourth threshold, then another warning similar to the above-described warning may be issued to the operator or user, as indicated by block 418 (FIG. 4B). As indicated by block 420, a reboot similar to the above-described reboot (block 410) may be performed. Following this reboot, the EDAC logic may be switched from using TECQED back to using SECDED, as indicated by block 422. To prevent back and forth switching, the decision (block 416) to switch back from TECQED to SECDED may be taken if the condition indicated in block 416 is satisfied for a longer time interval than the condition indicated in block 406. That is, the second time interval (i.e., the block 414 time interval) may be longer than the first time interval (i.e., the block 404 time interval). Also the threshold for switching from TECQED to SECDED (i.e., the block 416 second threshold) can be made lower than the threshold for switching from SECDED to TECQED (i.e., the block 406 first threshold) or it can even be made zero. The method 400 may then continue as described above with regard to block 404 (FIG. 4A), where the EDAC logic is again monitored for 1-bit error corrections.

Figure 5A:
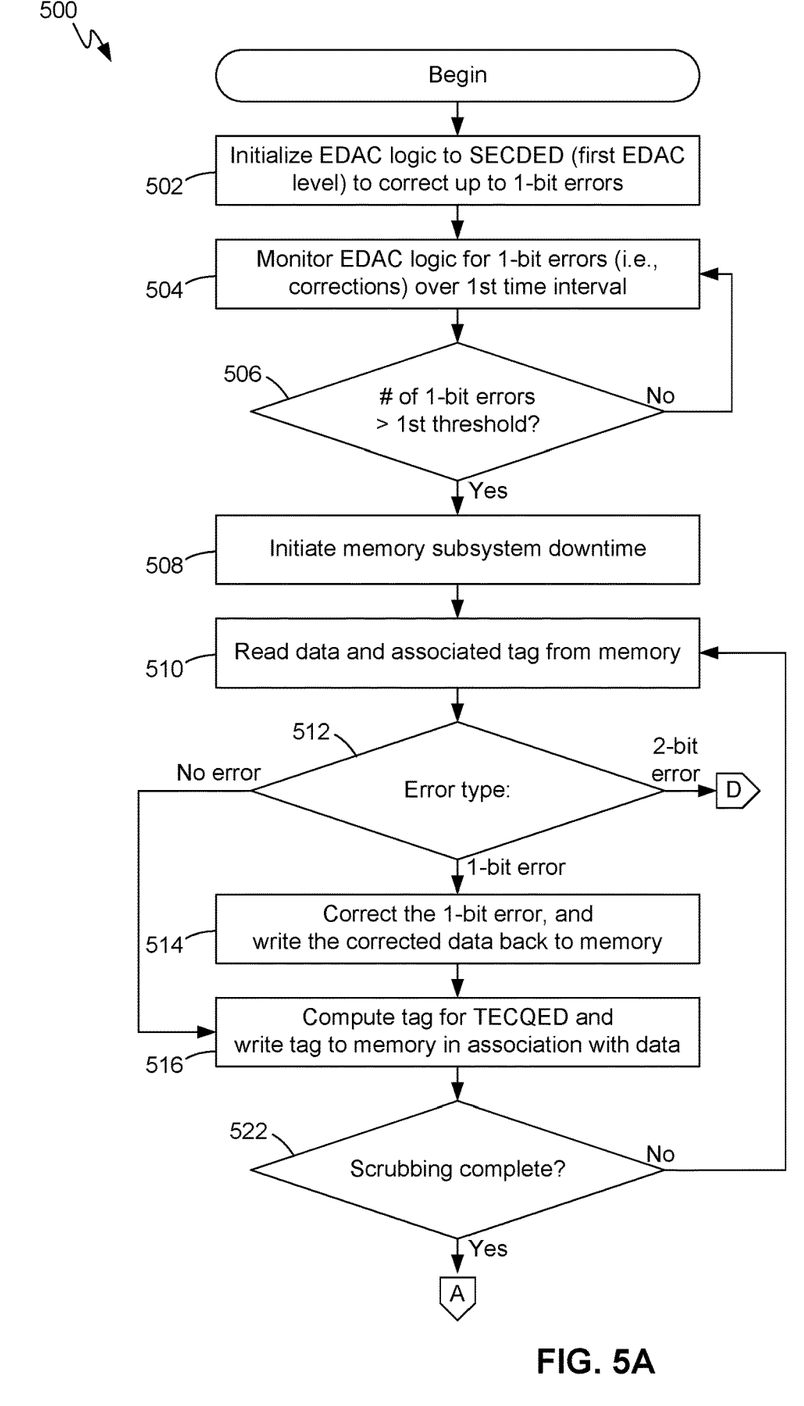
FIG. 5A is a flow diagram illustrating another method for adaptive memory EDAC, in accordance with exemplary embodiments.
Figure 5B:
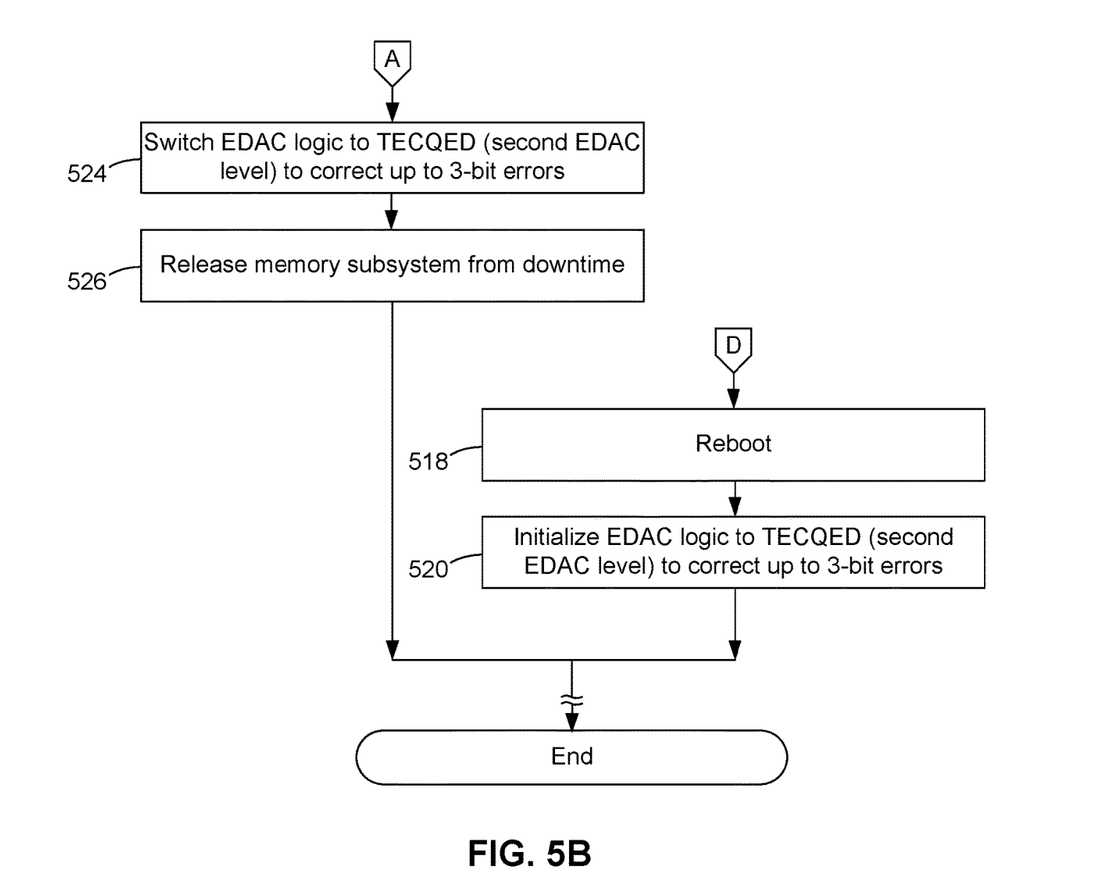
FIG. 5B is a continuation of the flow diagram of FIG. 5A.

As shown in FIGS. 5A-5B, a method 500 for adaptive memory error detection and correction may include the following. As indicated by block 502, the method 500 may include initializing the EDAC logic of a memory system or subsystem to use SECDED and thus to correct up to 1-bit errors. As indicated by block 504, the method 500 may further include monitoring the EDAC logic for 1-bit error corrections, including determining the number of 1-bit error corrections over a first time interval. As indicated by block 506, the method 500 may also include determining whether the number of 1-bit error corrections made by the EDAC logic during the first time interval is greater than a first threshold. If it is determined that the number of error corrections made by the EDAC logic during the first time interval is not greater than the first threshold, then the method 500 may continue as described above with regard to block 504, where the EDAC logic continues to be monitored for 1-bit error corrections.

If it is determined that the number of 1-bit error corrections made by the EDAC logic during the first time interval is greater than the first threshold, then a sub-method that may be referred to as memory "scrubbing" may be performed. Memory scrubbing refers to suspending operation of the memory system and, during the resultant memory downtime, attempting to correct errors in data stored in the memory (or a portion thereof). During the memory downtime, a memory controller may not grant write or read requests from a processor.

As indicated by block 508, memory system downtime may be initiated. Then, during the downtime, data words and associated tags may be read from the memory or portion thereof to be scrubbed. As indicated by block 510, a data word and associated tag may be read from the memory. As indicated by block 512, an error type may be determined. The error type may be one of: no error, 1-bit error, or 2-bit error. If the error type is 1-bit error, then the 1-bit error may be corrected and the corrected data may be written back into the memory, as indicated by block 514. However, after the 1-bit error is corrected, the tag associated with that data word is not written back into the memory. Rather, TECQED is used to compute a new tag for the data word, and the new tag is written to the memory in association with the corrected data word, as indicated by block 516. Similarly, if it is determined that the error type is no error, then in accordance with block 516 TECQED is used to compute a new tag for the data word, and that tag is written to the memory in association with the data word.

If it is determined (block 512) that the error type is 2-bit error, then the computing system may be rebooted, as indicated by block 518 (FIG. 5B). As SECDED cannot correct a 2-bit error, rebooting the computing system, including the memory subsystem and other subsystems of the computing system, precludes the erroneous data from adversely affecting operation of the computing system. When rebooting has completed, the EDAC logic may be initialized to use TECQED, as indicated by block 520. Rebooted to that initial state, the computing system and its memory system may return to their normal operational mode (e.g., controlling a vehicle). Such return to normal operational mode, but with the EDAC logic using TECQED, is not shown in FIG. 5 for purposes of clarity.

Returning to the cases of a 1-bit error or no error, after a new tag has been computed and written to the memory (block 516), it may be determined whether scrubbing has been completed, as indicated by block 522. That is, it may be determined whether all data words in the portion of memory being scrubbed have been read, any correctable 1-bit errors corrected, and new tags computed in accordance with TECQED and stored in the memory. If it is determined (block 522) that scrubbing has not yet been completed, i.e., there are more data words to be scrubbed, then the method 500 may continue as described above with regard to block 510.

If it is determined (block 522) that scrubbing has been completed, then the EDAC logic may be switched from using SECDED to using TECQED, as indicated by block 524. After switching from SECDED to TECQED, the memory system or subsystem may be released from downtime, as indicated by block 526. With the EDAC logic using TECQED, the computing system and its memory system may return to their normal operational mode (e.g., controlling a vehicle). Although not shown in FIGS. 5A-5B, for purposes of clarity, switching back from TECQED to SECDED can be conditioned in the same manner described above with regard to block 312 (FIG. 3) and block 416 (FIG. 4A). That is, switching back from TECQED to SECDED can be conditioned on a determination that the number of 1-bit errors detected during a second time interval is not greater than the second threshold, and the number of 2-bit errors detected during the second time interval is not greater than the third threshold, and the number of 3-bit errors detected during the second time interval is not greater than the fourth threshold. To prevent back and forth switching, the decision to switch back from TECQED to SECDED can be taken if the above condition is satisfied for a longer time interval than the time interval indicated in block 504. Also, the second threshold for switching from TECQED to SECDED can be made lower than the first threshold for switching from SECDED to TECQED or it can even be made zero.

The EDAC level controller 114 may be configured to control any of the above-described exemplary methods 200 (FIG. 2), 300 (FIG. 3), 400 (FIGS. 4A-4B) or 500 (FIGS. 5A-5B). In an example, in which the EDAC level controller 114 includes a processor and memory, firmware or software that configures such a processor in operation may be stored in the memory. Execution of such firmware or software may control aspects of any of the above-described methods or configure aspects of any of the above-described systems. Any such memory or other non-transitory storage medium having firmware or software stored therein in computer-readable form for execution by processor hardware may be an example of a "computer-readable medium," as the term is understood in the patent lexicon.

Figure 6:
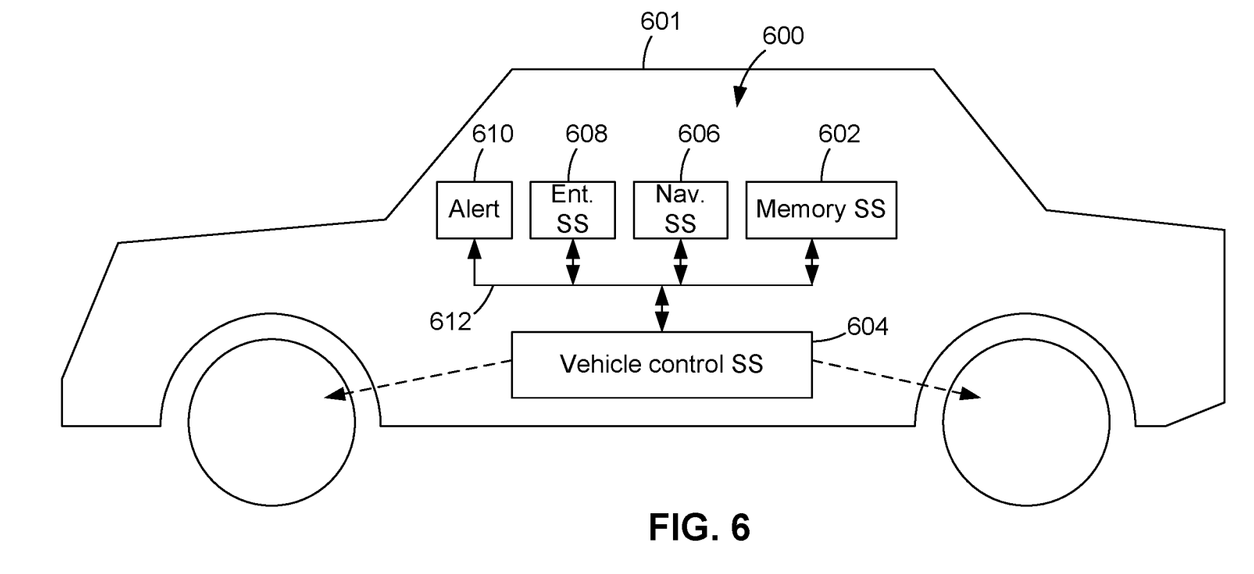
FIG. 6 is a block diagram of a vehicle computing system, in accordance with exemplary embodiments.

As shown in FIG. 6, a vehicle-based computing system 600 may include a memory subsystem 602. The vehicle-based computing system 600 may be an example of the computing system referenced in any of the above-described methods 200 (FIG. 2), 300 (FIG. 3), 400 (FIGS. 4A-4B) or 500 (FIGS. 5A-5B). The memory subsystem 602 may be an example of the above-described memory system 100 (FIG. 1).

A vehicle 601 in which the vehicle-based computing system 600 is located may at times during its operation be subjected to harsh environmental conditions or effects, such as radiation from solar flares or other sources, cosmic rays, etc. Such environmental conditions or effects may cause data bits stored in the memory to flip from a correct state to an erroneous state. In accordance with the solutions described above, such bit flips or errors may be corrected or their adverse effects otherwise mitigated. It is contemplated that a more robust EDAC level may be applied when the vehicle 601 experiences such environmental conditions and revert to a less robust but more efficient (e.g., less computationally intensive, more efficient in use of memory space, etc.) EDAC level when the vehicle 601 no longer experiences the conditions. Nevertheless, the methods and other solutions described above are not limited to mitigating the effects of bit errors caused by environmental conditions and may be applied regardless of the cause of the bit errors. Further, the methods and other solutions described herein are not limited to vehicles or other safety-critical systems and may be applied in any other contexts.

The vehicle-based computing system 600 may further include other subsystems, such as, for example, a vehicle control subsystem 604, a navigation subsystem 606, an entertainment subsystem 608, etc. The vehicle-based computing system 600 may also include an alert or warning indicator 610, such as a feature of a display screen on a vehicle dashboard. A bus or other data interconnect 612 may provide data communication among the various subsystems and other components. Some of the subsystems may have one or more processors (not separately shown), which may initiate memory transactions of the type described above (i.e., write, read, etc.) with the memory subsystem 602. Accordingly, the various subsystems and their processors may use data stored in the memory subsystem 602 in performing their normal operations, such as controlling operation of the vehicle in the case of the vehicle control subsystem 604, aiding vehicle navigation in the case of the navigation subsystem 606, etc.

Some of the subsystems may involve safety-critical functions, while others may not. For example, the vehicle control system 604 may control aspects of the vehicle motive power, braking, or steering, as conceptually indicated in FIG. 6 by broken-line arrows. It may be appreciated that erroneous operation of the vehicle control subsystem 604 or the navigation subsystem 606 due to corrupted data read from the memory subsystem 602 may adversely impact safety. Accordingly, in some examples the scrubbing feature described above with regard to FIGS. 5A-5B may be directed to memory regions in which safety-critical data is stored. In some examples, only memory regions in which safety-critical data or other significant data is stored may be scrubbed, while memory regions in which non-safety-critical data or data whose corruption would otherwise not be harmful is stored may not be scrubbed. Nevertheless, in other examples the scrubbing feature may be directed to any regions or amount of memory, including the memory in its entirety.

Implementation examples are described in the following numbered clauses:

1. A method for adaptive memory error detection and correction (EDAC), comprising:
   monitoring EDAC logic of a memory subsystem for error corrections with the EDAC logic configured to use a first EDAC level;
   determining a number of error corrections using the first EDAC level during a first time interval;
   determining whether the number of error corrections using the first EDAC level during the first time interval exceeds a first threshold; and
   switching the EDAC logic from using the first EDAC level to using a second EDAC level when the number of error corrections using the first EDAC level during the first time interval exceeds the first threshold.
2. The method of clause 1, wherein:
   the first EDAC level comprises error corrections of up to a first number of erroneous bits, wherein determining the number of error corrections using the first EDAC level comprises determining the number of error corrections of the first number of erroneous bits; and
   the second EDAC level comprises error corrections of up to a second number of erroneous bits greater than the first number of erroneous bits.
3. The method of clause 2, further comprising:
   monitoring the EDAC logic for error corrections with the EDAC logic configured to use the second EDAC level after switching the EDAC logic from using the first EDAC level to using the second EDAC level;
   determining the number of error corrections using the second EDAC level during a second time interval, including determining the number of error corrections of the second number of erroneous bits;
   determining whether the number of error corrections of the first number of erroneous bits during the second time interval is greater than a second threshold, wherein the second threshold is less than the first threshold;
   determining whether the number of error corrections of the second number of erroneous bits during the second time interval is greater than a third threshold, wherein the third threshold is less than the second threshold; and
   switching the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold.
4. The method of clause 3, wherein the second threshold and third threshold are zero erroneous bits and the first threshold is greater than zero erroneous bits.
5. The method of any of clauses 2-4, wherein the second time interval is greater than the first time interval.
6. The method of clause 3 or 4, wherein:
   determining the number of error corrections using the second EDAC level during the second time interval further includes determining the number of error corrections of a third number of erroneous bits greater than the second number of erroneous bits;
   determining whether the number of error corrections of the third number of erroneous bits during the second time interval is greater than a fourth threshold; and
   switching the EDAC logic from using the second EDAC level to using the first EDAC level further includes switching the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold and the number of error corrections of the third number of erroneous bits during the second time interval does not exceed the fourth threshold.
7. The method of any of clauses 1-6, wherein the first EDAC level is Single Error Correction/Double Error Detection (SECDED), and the second EDAC level is Triple Error Correction/Quad Error Detection (TECQED).
8. The method of any of clauses 1-7, further comprising performing a reboot when the number of error corrections using the first EDAC level during the first time interval exceeds the first threshold.
9. The method of any of clauses 1-8, further comprising, when the number of error corrections using the first EDAC level during the first time interval exceeds the first threshold:
   reading, during a memory subsystem downtime, data from the memory subsystem with the EDAC logic configured to use the first EDAC level; and
   writing, during the memory subsystem downtime, the data back to the memory subsystem with the EDAC logic configured to use the second EDAC level.
10. A system for adaptive memory error detection and correction (EDAC), comprising:
    EDAC logic in a memory subsystem; and
    EDAC level control logic configured to:
    monitor the EDAC logic for error corrections with the EDAC logic configured to use a first EDAC level;
    determine a number of error corrections using the first EDAC level during a first time interval;
    determine whether the number of error corrections using the first EDAC level during the first time interval exceeds a first threshold; and
    switch the EDAC logic from using the first EDAC level to using a second EDAC level when the number of error corrections using the first EDAC level during the first time interval exceeds the first threshold.
11. The system of clause 10, wherein:
    the first EDAC level comprises error corrections of up to a first number of erroneous bits, wherein the EDAC level control logic is configured to determine the number of error corrections using the first EDAC level by being configured to determine the number of error corrections of the first number of erroneous bits; and
    the second EDAC level comprises error corrections of up to a second number of erroneous bits greater than the first number of erroneous bits.
12. The system of clause 11, wherein the EDAC level control logic is further configured to:
    monitor the EDAC logic for error corrections with the EDAC logic configured to use the second EDAC level after switching the EDAC logic from using the first EDAC level to using the second EDAC level;
determine the number of error corrections using the second EDAC level during a second time interval, including determining the number of error corrections of the second number of erroneous bits;
determine whether the number of error corrections of the first number of erroneous bits during the second time interval is greater than a second threshold, wherein the second threshold is less than the first threshold;
determine whether the number of error corrections of the second number of erroneous bits during the second time interval is greater than a third threshold, wherein the third threshold is less than the second threshold; and
switch the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold.

13. The system of clause 12, wherein the second threshold and third threshold are zero erroneous bits and the first threshold is greater than zero erroneous bits.

14. The system of clause 12 or 13, wherein the second time interval is greater than the first time interval.

15. The system of any of clauses 12-14, wherein:
the EDAC level control logic is configured to determine the number of error corrections using the second EDAC level during the second time interval further by being configured to determine the number of error corrections of a third number of erroneous bits greater than the second number of erroneous bits;
the EDAC level control logic is configured to determine whether the number of error corrections of the third number of erroneous bits during the second time interval is greater than a fourth threshold; and
the EDAC level control logic is configured to switch the EDAC logic from using the second EDAC level to using the first EDAC level by being configured to switch the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold and the number of error corrections of the third number of erroneous bits during the second time interval does not exceed the fourth threshold.

16. The system of any of clauses 10-15, wherein the first EDAC level is Single Error Correction/Double Error Detection (SECDED), and the second EDAC level is Triple Error Correction/Quad Error Detection (TECQED).

17. The system of any of clauses 10-16, wherein the EDAC level control logic is further configured to perform a reboot when the number of error corrections using the first EDAC level during the first time interval exceeds the first threshold.

18. The system of any of clauses 10-17, wherein the EDAC level control logic is further configured to, when the number of error corrections using the first EDAC level during the first time interval exceeds the first threshold:
read, during a memory subsystem downtime, data from the memory subsystem with the EDAC logic configured to use the first EDAC level; and
write, during the memory subsystem downtime, the data back to the memory subsystem with the EDAC logic configured to use the second EDAC level.

19. The system of any of clauses 10-18, wherein the EDAC level control logic and the EDAC logic are included in a vehicle.

20. A system for adaptive memory error detection and correction (EDAC), comprising:
means for monitoring EDAC logic of a memory subsystem for error corrections with the EDAC logic configured to use a first EDAC level;
means for determining a number of error corrections using the first EDAC level during a first time interval;
means for determining whether the number of error corrections using the first EDAC level during the first time interval exceeds a first threshold; and
means for switching the EDAC logic from using the first EDAC level to using a second EDAC level when the number of error corrections using the first EDAC level during the first time interval exceeds the first threshold.

21. The system of clause 20, wherein:
the first EDAC level comprises error corrections of up to a first number of erroneous bits, wherein the means for determining the number of error corrections using the first EDAC level comprises means for determining the number of error corrections of the first number of erroneous bits; and
the second EDAC level comprises error corrections of up to a second number of erroneous bits greater than the first number of erroneous bits.

22. The system of clause 21, further comprising:
means for monitoring the EDAC logic for error corrections with the EDAC logic configured to use the second EDAC level after switching the EDAC logic from using the first EDAC level to using the second EDAC level;
means for determining the number of error corrections using the second EDAC level during the second time interval, including determining the number of error corrections of the second number of erroneous bits;
means for determining whether the number of error corrections of the first number of erroneous bits during the second time interval is greater than a second threshold, wherein the second threshold is less than the first threshold;
means for determining whether the number of error corrections of the second number of erroneous bits during the second time interval is greater than a third threshold, wherein the third threshold is less than the second threshold; and
means for switching the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold.

23. The system of clause 20, wherein the second threshold and third threshold are zero erroneous bits and the first threshold is greater than zero erroneous bits.

24. The system of clause 22 or 23, wherein the second time interval is greater than the first time interval.

25. The system of any of clauses 22-24, wherein:
   the means for determining the number of error corrections using the second EDAC level during the second time interval further includes means for determining the number of error corrections of a third number of erroneous bits greater than the second number of erroneous bits;
   the system further comprises means for determining whether the number of error corrections of the third number of erroneous bits during the second time interval is greater than a fourth threshold; and
   the means for switching the EDAC logic from using the second EDAC level to using the first EDAC level further includes means for switching the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold and the number of error corrections of the third number of erroneous bits during the second time interval does not exceed the fourth threshold.

26. The system of any of clauses 20-25, wherein the first EDAC level is Single Error Correction/Double Error Detection (SECDED), and the second EDAC level is Triple Error Correction/Quad Error Detection (TECQED).

27. The system of any of any of clauses 20-26, further comprising means for performing a reboot when the number of error corrections using the first EDAC level during the first time interval exceeds the first threshold.

28. The system of any of clauses 20-27, further comprising means for, when the number of error corrections using the first EDAC level during the first time interval exceeds the first threshold:
   reading, during a memory subsystem downtime, data from the memory subsystem with the EDAC logic configured to use the first EDAC level; and
   writing, during the memory subsystem downtime, the data back to the memory subsystem with the EDAC logic configured to use the second EDAC level.

29. A computer-readable medium for adaptive memory error detection and correction (EDAC), the computer-readable medium comprising a non-transitory computer-readable medium having instructions stored thereon in computer-executable form, the instructions when executed by a processing system of a computing device configuring the processing system to control:
   monitoring EDAC logic of a memory subsystem for error corrections with the EDAC logic configured to use a first EDAC level;
   determining a number of error corrections using the first EDAC level during a first time interval;
   determining whether the number of error corrections using the first EDAC level during the first time interval exceeds a first threshold; and
   switching the EDAC logic from using the first EDAC level to using a second EDAC level when the number of error corrections using the first EDAC level during the first time interval exceeds the first threshold.

30. The computer-readable medium of clause 29, wherein:
   the first EDAC level comprises error corrections of up to a first number of erroneous bits, wherein determining the number of error corrections using the first EDAC level comprises determining the number of error corrections of the first number of erroneous bits; and
   the second EDAC level comprises error corrections of up to a second number of erroneous bits greater than the first number of erroneous bits.

31. The computer-readable medium of clause 30, wherein the instructions further configure the processing system to control:
   monitoring the EDAC logic for error corrections with the EDAC logic configured to use the second EDAC level after switching the EDAC logic from using the first EDAC level to using the second EDAC level;
   determining the number of error corrections using the second EDAC level during a second time interval, including determining the number of error corrections of the second number of erroneous bits;
   determining whether the number of error corrections of the first number of erroneous bits during the second time interval is greater than a second threshold, wherein the second threshold is less than the first threshold;
   determining whether the number of error corrections of the second number of erroneous bits during the second time interval is greater than a third threshold, wherein the third threshold is less than the second threshold; and
   switching the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold.

32. The computer-readable medium of clause 31, wherein the second threshold and third threshold are zero erroneous bits and the first threshold is greater than zero erroneous bits.

33. The computer-readable medium of clause 31 or 32, wherein the second time interval is greater than the first time interval.

34. The computer-readable medium of any of clauses 31-33, wherein:
   the instructions configuring to processing system to control determining the number of error corrections using the second EDAC level during the second time interval include instructions configuring the processing system to control determining the number of error corrections of a third number of erroneous bits greater than the second number of erroneous bits;
   the instructions further configure the processing system to control determining whether the number of error corrections of the third number of erroneous bits during the second time interval is greater than a fourth threshold; and
   the instructions further configure the processing system to switch the EDAC logic from using the second EDAC level to using the first EDAC level further includes switching the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold and the number of error corrections of the third number of erroneous bits during the second time interval does not exceed the fourth threshold.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for adaptive memory error detection and correction (EDAC), comprising:
   monitoring EDAC logic of a memory subsystem for error corrections with the EDAC logic configured to use a first EDAC level;
   determining a number of error corrections using the first EDAC level during a first time interval;
   determining whether the number of error corrections using the first EDAC level during the first time interval exceeds a first threshold; and
   switching the EDAC logic from using the first EDAC level to using a second EDAC level when the number of error corrections using the first EDAC level during the first time interval exceeds the first threshold.

2. The method of claim 1, wherein:
   the first EDAC level comprises error corrections of up to a first number of erroneous bits, wherein determining the number of error corrections using the first EDAC level comprises determining the number of error corrections of the first number of erroneous bits; and
   the second EDAC level comprises error corrections of up to a second number of erroneous bits greater than the first number of erroneous bits.

3. The method of claim 2, further comprising:
   monitoring the EDAC logic for error corrections with the EDAC logic configured to use the second EDAC level after switching the EDAC logic from using the first EDAC level to using the second EDAC level;
   determining the number of error corrections using the second EDAC level during a second time interval, including determining the number of error corrections of the first and second number of erroneous bits;
   determining whether the number of error corrections of the first number of erroneous bits during the second time interval is greater than a second threshold, wherein the second threshold is less than the first threshold;
   determining whether the number of error corrections of the second number of erroneous bits during the second time interval is greater than a third threshold, wherein the third threshold is less than the second threshold; and
   switching the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold.

4. The method of claim 3, wherein the second threshold and third threshold are zero erroneous bits and the first threshold is greater than zero erroneous bits.

5. The method of claim 3, wherein the second time interval is greater than the first time interval.

6. The method of claim 3, wherein:
   determining the number of error corrections using the second EDAC level during the second time interval further includes determining the number of error corrections of a third number of erroneous bits greater than the second number of erroneous bits;
   determining whether the number of error corrections of the third number of erroneous bits during the second time interval is greater than a fourth threshold; and
   switching the EDAC logic from using the second EDAC level to using the first EDAC level further includes switching the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold and the number of error corrections of the third number of erroneous bits during the second time interval does not exceed the fourth threshold.

7. The method of claim 6, wherein the first EDAC level is Single Error Correction/Double Error Detection (SECDED), and the second EDAC level is Triple Error Correction/Quad Error Detection (TECQED).

8. The method of claim 1, further comprising performing a reboot when the number of error corrections using the first EDAC level during the first time interval exceeds the first threshold.

9. The method of claim 1, further comprising, when the number of error corrections using the first EDAC level during the first time interval exceeds the first threshold:
   reading, during a memory subsystem downtime, data from the memory subsystem with the EDAC logic configured to use the first EDAC level; and
   writing, during the memory subsystem downtime, the data back to the memory subsystem with the EDAC logic configured to use the second EDAC level.

10. A system for adaptive memory error detection and correction (EDAC), comprising:
    EDAC logic in a memory subsystem; and
    EDAC level control logic configured to:
    monitor the EDAC logic for error corrections with the EDAC logic configured to use a first EDAC level;
    determine a number of error corrections using the first EDAC level during a first time interval;
    determine whether the number of error corrections using the first EDAC level during the first time interval exceeds a first threshold; and
    switch the EDAC logic from using the first EDAC level to using a second EDAC level when the number of error corrections using the first EDAC level during the first time interval exceeds the first threshold.

11. The system of claim 10, wherein:
    the first EDAC level comprises error corrections of up to a first number of erroneous bits, wherein the EDAC level control logic is configured to determine the number of error corrections using the first EDAC level by being configured to determine the number of error corrections of the first number of erroneous bits; and the second EDAC level comprises error corrections of up to a second number of erroneous bits greater than the first number of erroneous bits.

12. The system of claim 11, wherein the EDAC level control logic is further configured to:
monitor the EDAC logic for error corrections with the EDAC logic configured to use the second EDAC level after switching the EDAC logic from using the first EDAC level to using the second EDAC level;
determine the number of error corrections using the second EDAC level during a second time interval, including determining the number of error corrections of the second number of erroneous bits;
determine whether the number of error corrections of the first number of erroneous bits during the second time interval is greater than a second threshold, wherein the second threshold is less than the first threshold;
determine whether the number of error corrections of the second number of erroneous bits during the second time interval is greater than a third threshold, wherein the third threshold is less than the second threshold; and
switch the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold.

13. The system of claim 12, wherein the second threshold and third threshold are zero erroneous bits and the first threshold is greater than zero erroneous bits.

14. The system of claim 12, wherein the second time interval is greater than the first time interval.

15. The system of claim 12, wherein:
the EDAC level control logic is configured to determine the number of error corrections using the second EDAC level during the second time interval further by being configured to determine the number of error corrections of a third number of erroneous bits greater than the second number of erroneous bits;
the EDAC level control logic is configured to determine whether the number of error corrections of the third number of erroneous bits during the second time interval is greater than a fourth threshold; and
the EDAC level control logic is configured to switch the EDAC logic from using the second EDAC level to using the first EDAC level by being configured to switch the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold and the number of error corrections of the third number of erroneous bits during the second time interval does not exceed the fourth threshold.

16. The system of claim 15, wherein the first EDAC level is Single Error Correction/Double Error Detection (SECDED), and the second EDAC level is Triple Error Correction/Quad Error Detection (TECQED).

17. The system of claim 10, wherein the EDAC level control logic is further configured to perform a reboot when the number of error corrections using the first EDAC level during the first time interval exceeds the first threshold.

18. The system of claim 10, wherein the EDAC level control logic is further configured to, when the number of error corrections using the first EDAC level during the first time interval exceeds the first threshold:
read, during a memory subsystem downtime, data from the memory subsystem with the EDAC logic configured to use the first EDAC level; and
write, during the memory subsystem downtime, the data back to the memory subsystem with the EDAC logic configured to use the second EDAC level.

19. The system of claim 10, wherein the EDAC level control logic and the EDAC logic are included in a vehicle.

20. A system for adaptive memory error detection and correction (EDAC), comprising:
means for monitoring EDAC logic of a memory subsystem for error corrections with the EDAC logic configured to use a first EDAC level;
means for determining a number of error corrections using the first EDAC level during a first time interval;
means for determining whether the number of error corrections using the first EDAC level during the first time interval exceeds a first threshold; and
means for switching the EDAC logic from using the first EDAC level to using a second EDAC level when the number of error corrections using the first EDAC level during the first time interval exceeds the first threshold.

21. The system of claim 20, wherein:
the first EDAC level comprises error corrections of up to a first number of erroneous bits, wherein the means for determining the number of error corrections using the first EDAC level comprises means for determining the number of error corrections of the first number of erroneous bits; and
the second EDAC level comprises error corrections of up to a second number of erroneous bits greater than the first number of erroneous bits.

22. The system of claim 21, further comprising:
means for monitoring the EDAC logic for error corrections with the EDAC logic configured to use the second EDAC level after switching the EDAC logic from using the first EDAC level to using the second EDAC level;
means for determining the number of error corrections using the second EDAC level during a second time interval, including determining the number of error corrections of the second number of erroneous bits;
means for determining whether the number of error corrections of the first number of erroneous bits during the second time interval is greater than a second threshold, wherein the second threshold is less than the first threshold;
means for determining whether the number of error corrections of the second number of erroneous bits during the second time interval is greater than a third threshold, wherein the third threshold is less than the second threshold; and
means for switching the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold.

23. The system of claim 22, wherein the second threshold and third threshold are zero erroneous bits and the first threshold is greater than zero erroneous bits.

24. The system of claim 22, wherein the second time interval is greater than the first time interval.

25. The system of claim 22, wherein:
the means for determining the number of error corrections using the second EDAC level during the second time interval further includes means for determining the number of error corrections of a third number of erroneous bits greater than the second number of erroneous bits;
the system further comprises means for determining whether the number of error corrections of the third number of erroneous bits during the second time interval is greater than a fourth threshold; and
the means for switching the EDAC logic from using the second EDAC level to using the first EDAC level further includes means for switching the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold and the number of error corrections of the third number of erroneous bits during the second time interval does not exceed the fourth threshold.

26. The system of claim 25, wherein the first EDAC level is Single Error Correction/Double Error Detection (SECDED), and the second EDAC level is Triple Error Correction/Quad Error Detection (TECQED).

27. The system of claim 20, further comprising means for performing a reboot when the number of error corrections using the first EDAC level during the first time interval exceeds the first threshold.

28. The system of claim 20, further comprising means for, when the number of error corrections using the first EDAC level during the first time interval exceeds the first threshold:
reading, during a memory subsystem downtime, data from the memory subsystem with the EDAC logic configured to use the first EDAC level; and
writing, during the memory subsystem downtime, the data back to the memory subsystem with the EDAC logic configured to use the second EDAC level.

29. A computer-readable medium for adaptive memory error detection and correction (EDAC), the computer-readable medium comprising a non-transitory computer-readable medium having instructions stored thereon in computer-executable form, the instructions when executed by a processing system of a computing device configuring the processing system to control:
monitoring EDAC logic of a memory subsystem for error corrections with the EDAC logic configured to use a first EDAC level;
determining a number of error corrections using the first EDAC level during a first time interval;
determining whether the number of error corrections using the first EDAC level during the first time interval exceeds a first threshold; and
switching the EDAC logic from using the first EDAC level to using a second EDAC level when the number of error corrections using the first EDAC level during the first time interval exceeds the first threshold.

30. The computer-readable medium of claim 29, wherein:
the first EDAC level comprises error corrections of up to a first number of erroneous bits, wherein determining the number of error corrections using the first EDAC level comprises determining the number of error corrections of the first number of erroneous bits; and
the second EDAC level comprises error corrections of up to a second number of erroneous bits greater than the first number of erroneous bits.

31. The computer-readable medium of claim 30, wherein the instructions further configure the processing system to control:
monitoring the EDAC logic for error corrections with the EDAC logic configured to use the second EDAC level after switching the EDAC logic from using the first EDAC level to using the second EDAC level;
determining the number of error corrections using the second EDAC level during a second time interval, including determining the number of error corrections of the second number of erroneous bits;
determining whether the number of error corrections of the first number of erroneous bits during the second time interval is greater than a second threshold, wherein the second threshold is less than the first threshold;
determining whether the number of error corrections of the second number of erroneous bits during the second time interval is greater than a third threshold, wherein the third threshold is less than the second threshold; and
switching the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold.

32. The computer-readable medium of claim 31, wherein the second threshold and third threshold are zero erroneous bits and the first threshold is greater than zero erroneous bits.

33. The computer-readable medium of claim 29, wherein the second time interval is greater than the first time interval.

34. The computer-readable medium of claim 31, wherein:
the instructions configuring to processing system to control determining the number of error corrections using the second EDAC level during the second time interval include instructions configuring the processing system to control determining the number of error corrections of a third number of erroneous bits greater than the second number of erroneous bits;
the instructions further configure the processing system to control determining whether the number of error corrections of the third number of erroneous bits during the second time interval is greater than a fourth threshold; and
the instructions further configure the processing system to switch the EDAC logic from using the second EDAC level to using the first EDAC level further includes switching the EDAC logic from using the second EDAC level to using the first EDAC level when the number of error corrections of the first number of erroneous bits during the second time interval does not exceed the second threshold and the number of error corrections of the second number of erroneous bits during the second time interval does not exceed the third threshold and the number of error corrections of the third number of erroneous bits during the second time interval does not exceed the fourth threshold.

* * * * *